United States Patent
Dueweke et al.

(10) Patent No.: US 7,405,389 B2
(45) Date of Patent: Jul. 29, 2008

(54) DENSE MULTI-AXIS ARRAY FOR MOTION SENSING

(75) Inventors: Michael J. Dueweke, Santa Clara, CA (US); Douglas A. Webb, Los Altos, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 266 days.

(21) Appl. No.: 11/280,830

(22) Filed: Nov. 15, 2005

(65) Prior Publication Data

US 2006/0109241 A1 May 25, 2006

Related U.S. Application Data

(60) Provisional application No. 60/629,733, filed on Nov. 19, 2004.

(51) Int. Cl.
*G01M 7/00* (2006.01)
*G11B 7/00* (2006.01)
*G01D 5/36* (2006.01)

(52) U.S. Cl. ............... 250/221; 250/237 G; 250/208.2
(58) Field of Classification Search ............... 356/614; 250/208.2, 221, 226, 237 G, 208.1
See application file for complete search history.

(56) References Cited

U.S. PATENT DOCUMENTS

| | | | |
|---|---|---|---|
| 3,922,093 A | 11/1975 | Dandliker et al. | |
| 4,218,623 A * | 8/1980 | Utagawa | 250/208.2 |
| 4,441,123 A * | 4/1984 | Ochi | 348/275 |
| 4,546,347 A | 10/1985 | Kirsch | |
| 4,605,308 A * | 8/1986 | Hankel et al. | 356/28 |
| 4,799,055 A | 1/1989 | Nestler et al. | |
| 4,812,635 A * | 3/1989 | Kaufmann et al. | 356/621 |
| 5,288,993 A | 2/1994 | Bidiville et al. | |
| 5,473,344 A | 12/1995 | Bacon et al. | |
| 5,534,693 A * | 7/1996 | Kondo et al. | 250/237 G |
| 5,578,813 A | 11/1996 | Allen et al. | |
| 5,644,139 A | 7/1997 | Allen et al. | |
| D382,550 S | 8/1997 | Kaneko et al. | |
| 5,654,741 A | 8/1997 | Sampsell et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |

(Continued)

OTHER PUBLICATIONS

PCT International Search Report for Application No. PCT/US2005/041952 (4 sheets).

(Continued)

*Primary Examiner*—Sang Nguyen
(74) *Attorney, Agent, or Firm*—Okamoto & Benedicto LLP

(57) ABSTRACT

The present disclosure describes an optical displacement sensor having a dense multi-axis array of photosensitive elements. Generally, the sensor includes a two dimensional array of multiple photosensitive elements. In one embodiment, the array includes multiple linear arrays of photosensitive elements arranged along three or more axes in a space-filling, close-packed multi-axis array. The photosensitive elements are connected to each other in such a way that motion is determinable along each of the axes by measuring differential photocurrents between photosensitive elements along each of the axes. The inventive architecture advantageously increases signal redundancy, and reduces signal drop-out or low signals due to random fluctuations in the incident or absorbed light or in the signals from the photosensitive elements.

8 Claims, 10 Drawing Sheets

U.S. PATENT DOCUMENTS

| | | | |
|---|---|---|---|
| 5,760,392 A * | 6/1998 | Hisamoto et al. | 250/237 G |
| 5,766,829 A | 6/1998 | Cathey, Jr. et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Dandliker et al. | |
| 5,917,544 A * | 6/1999 | Sobotta et al. | 348/222.1 |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,225,617 B1 | 5/2001 | Dandliker et al. | |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |
| 6,330,057 B1 | 12/2001 | Lederer et al. | |
| 6,351,257 B1 | 2/2002 | Liu | |
| 6,396,479 B2 | 5/2002 | Gordon | |
| 6,421,045 B1 | 7/2002 | Venkat et al. | |
| 6,424,407 B1 | 7/2002 | Kinrot et al. | |
| 6,433,780 B1 | 8/2002 | Gordon et al. | |
| 6,452,683 B1 | 9/2002 | Kinrot et al. | |
| 6,455,840 B1 | 9/2002 | Oliver et al. | |
| D464,352 S | 10/2002 | Kerestegian | |
| 6,462,330 B1 | 10/2002 | Venkat et al. | |
| 6,476,376 B1 * | 11/2002 | Biegelsen et al. | 250/221 |
| 6,476,970 B1 | 11/2002 | Smith | |
| 6,529,184 B1 | 3/2003 | Julienne | |
| 6,585,158 B2 | 7/2003 | Norskog | |
| 6,603,111 B2 | 8/2003 | Dietz et al. | |
| 6,621,483 B2 | 9/2003 | Wallace et al. | |
| 6,642,506 B1 | 11/2003 | Nahum et al. | |
| 6,657,184 B2 | 12/2003 | Anderson et al. | |
| 6,664,948 B2 | 12/2003 | Crane et al. | |
| 6,674,475 B1 | 1/2004 | Anderson | |
| 6,677,929 B2 | 1/2004 | Gordon et al. | |
| 6,703,599 B1 | 3/2004 | Casebolt et al. | |
| 6,737,636 B2 | 5/2004 | Dietz et al. | |
| 6,774,351 B2 | 8/2004 | Black | |
| 6,774,915 B2 | 8/2004 | Rensberger | |
| 6,795,056 B2 | 9/2004 | Norskog et al. | |
| 6,809,723 B2 | 10/2004 | Davis | |
| 6,819,314 B2 | 11/2004 | Black | |
| 6,823,077 B2 | 11/2004 | Dietz et al. | |
| 7,122,781 B2 * | 10/2006 | Rotzoll et al. | 250/221 |
| 7,268,341 B2 * | 9/2007 | Lehoty et al. | 250/221 |
| 2002/0080121 A1 | 6/2002 | Son | |
| 2002/0130835 A1 | 9/2002 | Brosnan | |
| 2002/0158300 A1 | 10/2002 | Gee | |
| 2002/0190953 A1 | 12/2002 | Gordon et al. | |
| 2003/0034959 A1 | 2/2003 | Davis et al. | |
| 2004/0084610 A1 | 5/2004 | Leong et al. | |
| 2004/0189593 A1 | 9/2004 | Koay | |
| 2005/0024336 A1 | 2/2005 | Xie et al. | |
| 2005/0024623 A1 | 2/2005 | Xie et al. | |
| 2005/0057510 A1 | 3/2005 | Baines et al. | |
| 2005/0062720 A1 | 3/2005 | Rotzoll et al. | |
| 2005/0083303 A1 | 4/2005 | Schroeder et al. | |

OTHER PUBLICATIONS

D.T. Amm, et al. "Grating Light Valve Technology: Update and Novel Applications" May 19, 1998, pp. 1-4, Silicon Light Machines. Presented at Society for Information Display Symposium, Anaheim, CA.

D. T. Amm, et al. "Optical Performance of the Grating Light Valve Technology" 1999, pp. 1-8, Silicon Light Machines. Presented at Photonics West-Electronics Imaging.

R.W. Corrigan, "An Alternative Architecture for High Performance Display" Nov. 20, 1999, pp. 1-5, Silicon Light Machines. Presented at SMPTE Technical Conference and Exhibition, New York, NY.

R.W. Corrigan, et al. "Calibration of a Scanned Linear Grating Light Valve Projection System" May 18, 1999, pp. 1-4, Silicon Light Machines. Presented at Society for Information Display Symposium, San Jose, CA.

Robert Corrigan, et al. "Silicon Light Machines—Grating Light Valve Tehcnology Brief", Jun. 2001 ver C. pp. 1-8; Sunnyvale, California.

D.M. Bloom,, et al. "The Grating Light Valve: revolutionizing display technology" 1997, pp. 1-10: Silicon Light Machines, Sunnyvale, California.

* cited by examiner

510

DENSE MULTI-AXIS ARRAY FOR MOTION SENSING

CROSS-REFERENCE TO RELATED APPLICATIONS

The present application claims the benefit of U.S. provisional patent application No. 60/629,733, entitled "Dense Multi-Axis Array Architectures for Motion Sensing," filed Nov. 19, 2004, by inventors Michael J. Dueweke and Douglas A. Webb. The disclosure of which is incorporated herein by reference in its entirety.

TECHNICAL FIELD

The present invention relates generally to an Optical Postioning Device (OPD).

BACKGROUND

Pointing devices, such as computer mice or trackballs, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In addition, the movement and resultant wear of the mechanical elements, particularly the shaft encoders, necessarily limit the useful life of the device.

One solution to the above problems has been the development of optical mice. Optical mice have become very popular, because they provide better pointing accuracy. One approach for measuring linear displacements uses an array of photosensors or detectors, such as photodiodes, in which the output of the individual detectors in the array are wired together in a repeating pattern spanning two or more detectors, referred to here as the M value of the array. Generally, the distribution of spatial frequencies in an image on the array is roughly centered around the spatial frequencies of the detectors, and signal processing techniques are used to track the movement of this image back and forth across the array.

The dominant architecture used in previous embodiments used two or more one dimensional (1D) arrays at substantially orthogonal angles to one another to track motion in two directions or dimensions. The drawback of this approach includes limited accuracy along directions that deviate significantly from the detector-array orientations. This is due to the fact that an off-axis image enters and leaves the array too quickly before the image has a chance to build-up an unambiguous signal. Thus, this approach does not provide sufficient redundancy for low-noise operation. In particular, for linear comb arrays having axes oriented orthogonally, motion primarily along one axis leads to a small signal in the orthogonal axis, and hence a small signal to noise ratio along the orthogonal axis.

An alternative implementation uses correlation uses a square two dimensional (2D) array consisting of pixel architectures that take differences along orthogonal axes, and therefore also do not provide needed redundancy in the outputs.

Accordingly, there is a need for an optical pointing device that is capable of detecting movement with an acceptable path error in both on-axis and off-axis directions. It is further desirable that the array have an architecture that simplifies data processing requirements.

SUMMARY

The present disclosure provides a solution to these and other problems, and offers further advantages over conventional optical displacement sensors or systems for sensing relative movement between the sensor and a surface by detecting changes in optical features of light reflected from the surface.

The present disclosure describes an optical displacement sensor having a dense multi-axis array of photosensitive elements. Generally, the sensor includes a two dimensional array of multiple photosensitive elements. In one embodiment, the array includes multiple linear arrays of photosensitive elements arranged along three or more axes in a space-filling, close-packed multi-axis array. The photosensitive elements are connected to each other in such a way that motion is determinable along each of the axes by measuring differential photocurrents between photosensitive elements along each of the axes. The inventive architecture advantageously increases signal redundancy, and reduces signal drop-out or low signals due to random fluctuations in the incident or absorbed light or in the signals from the photosensitive elements. In some embodiments, each of the axes form non-orthogonal angles to the remaining axes. In other embodiments, certain pairs of axes may form orthogonal angles.

The present disclosure also describes a method of sensing relative movement between an optical displacement sensor or system and a surface by detecting changes in optical features of light reflected from the surface.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

DETAILED DESCRIPTION

The present disclosure relates generally to a sensor for an Optical Positioning Device (OPD), and to methods for sensing relative movement between the sensor and a surface based on displacement of a random intensity distribution pattern of light generated from the surface. The random distribution pattern of light can include, for example, speckle that is generated by scattering of light from a coherent source scattered off of a rough surface. OPDs can include, for example, optical mice or trackballs for inputting data to a personal computer.

Reference herein to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

The following description describes a photodetection technique which combines the 2D displacement measurement accuracy of a correlator with the signal processing simplicity of a comb-array.

Optical Positioning Device Architecture

Generally, the sensor includes an illuminator having a light source and illumination optics to illuminate a portion of the surface, a detector having a number of photosensitive elements and imaging optics, and signal processing or mixed-signal electronics for combining signals from each of the photosensitive elements to produce an output signal from the detector.

Figure 1:
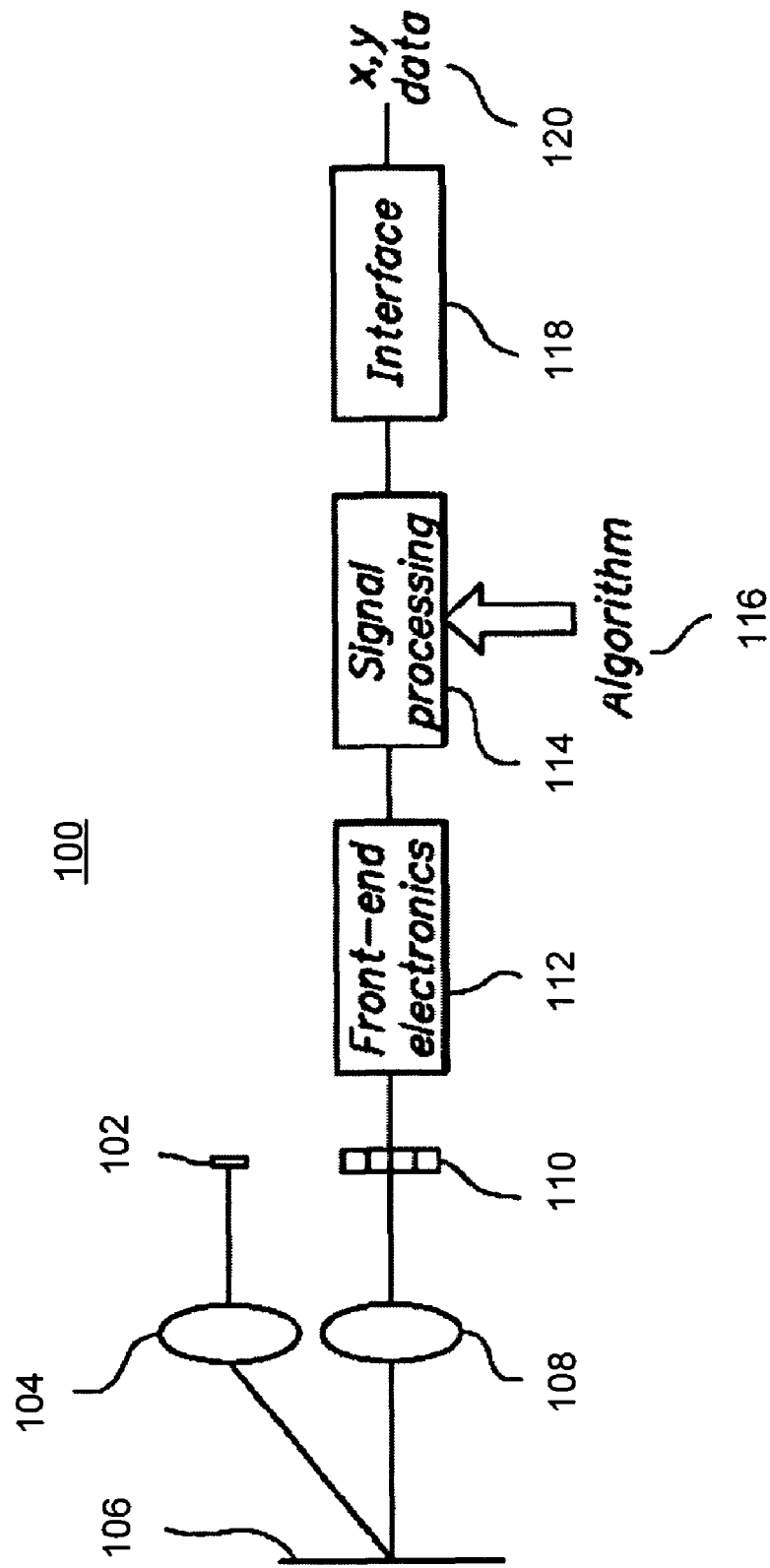
FIG. 1 is a functional block diagram of an optical mouse for which a multi-axis array architecture according to an embodiment of the present invention is particularly useful.

An exemplary embodiment of an optical mouse for which the signal processing algorithm according to the present invention is particularly useful will now be described with reference to FIG. 1. FIG. 1 is functional diagram of an optical positioning device 100 having at least two sets of multiple CMOS photodiode arrays, or Linear Comb Arrays (LCAs) 110, configured to provide displacement measurements along two orthogonal axes, x and y. Groups of the photodiodes in each array are passively combined to produce group signals, which are subsequently algebraically combined to produce an (x, y) signal providing information on the magnitude and direction of displacement of the OPD in x and y directions.

The system 100 shown in FIG. 1 includes a laser source 102, illumination optics 104, imaging optics 108, at least two sets of multiple CMOS photodiode arrays 110, front-end electronics 112, signal processing circuitry 114, and interface circuitry 118. As mentioned above, the photodiode arrays 110 may be configured to provide displacement measurements along two orthogonal axes, x and y. Groups of the photodiodes in each array may be combined using passive electronic components in the front-end electronics 112 to produce group signals. The group signals may be subsequently algebraically combined by the signal processing circuitry 114 to produce an (x, y) signal providing information on the magnitude and direction of displacement of the OPD in x and y directions. The (x,y) signal may be converted by the interface circuitry 118 to x,y data 120 which may be output by the OPD. Sensors using this detection technique may have arrays of interlaced groups of linear photodiodes known as "differential comb arrays."

Although described in detail with reference to LCAs of CMOS photodiodes, it will be understood that the method of the present invention is not limited to any one particularly type of photosensor, i.e., CMOS photodiodes, but can be applied equally well to any type of LCA photodetector CMOS, CCD, etc.

Linear Comb Arrays (LCAs)

As noted above, the output of the individual detectors in the LCA are wired together in a repeating pattern spanning two or more detectors, referred to as the M value of the array. An example of an LCA with an M value of 4 is shown in FIG. 2.

Figure 2:
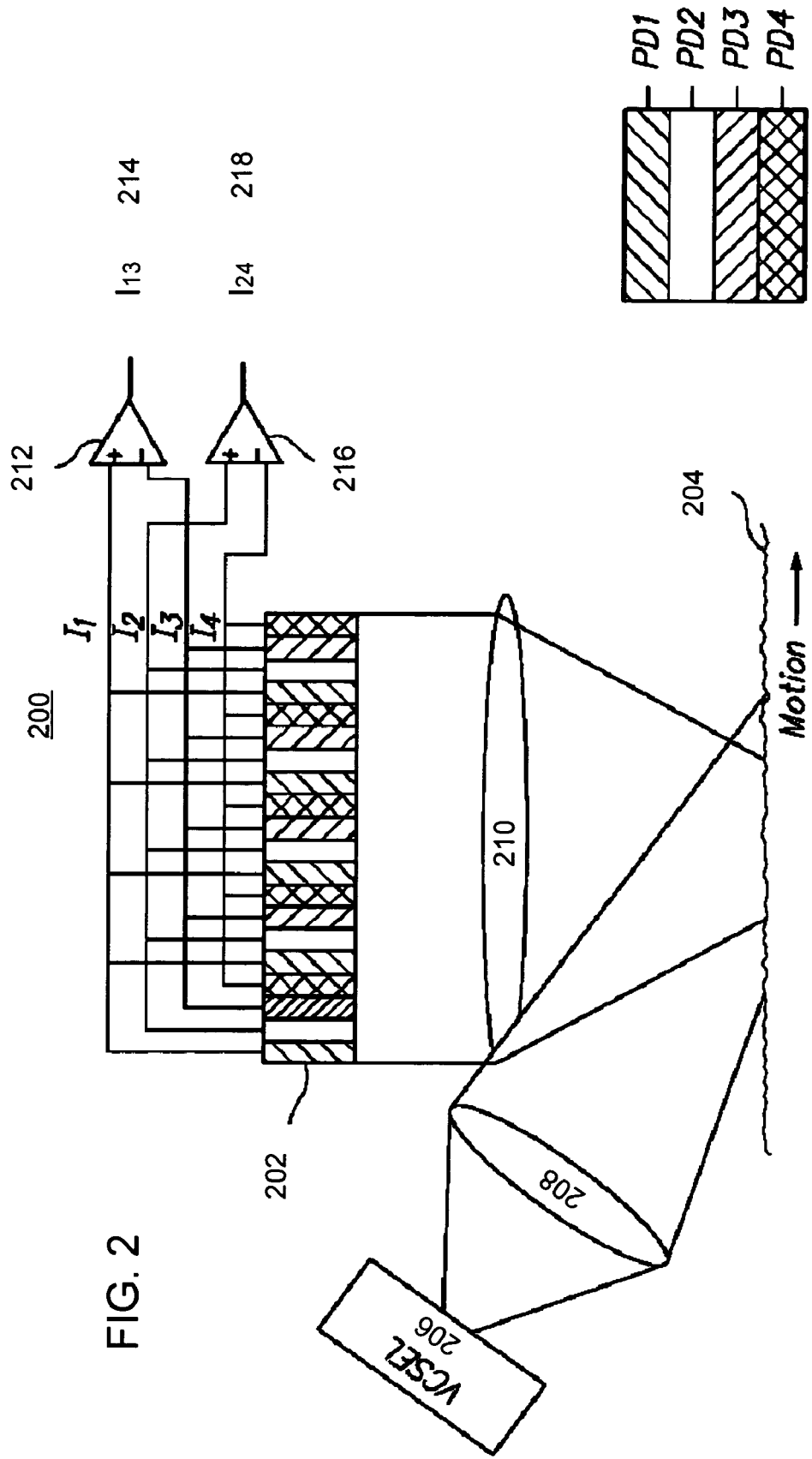
FIG. 2 is a schematic block diagram including a one-dimensional (1D) linear comb-detector array in a '4N' configuration.

FIG. 2 shows a general configuration (along one axis) of such a photodiode array 202, wherein the surface 204 is illuminated by a coherent light source, such as a Vertical Cavity Surface Emitting Laser (VCSEL) 206 and illumination optics 208, and wherein the combination of interlaced groups in the array 202 serves as a periodic filter on spatial frequencies of light-dark signals produced by the speckle images. Speckle generated by the rough surface 204 is mapped to the detector plane with imaging optics 210.

In one embodiment, the comb array detection is performed in two independent, orthogonal arrays to obtain estimations of displacements in x and y. A small version of one such array 202 is depicted in FIG. 2.

Each array in the detector consists of a number, N, of photodiode sets, each set having a number, M, of photodiodes (PD) arranged to form an MN linear array. In the embodiment shown in FIG. 2, each set consists of four photodiodes (4 PD) referred to as 1, 2, 3, 4. The PD1s from every set are electrically connected (wired sum) to form a group, likewise PD2s, PD3s, and PD4s, giving four signal lines coming out from the array. Their corresponding currents or signals are $I_1$, $I_2$, $I_3$, and $I_4$. These signals ($I_1$, $I_2$, $I_3$, and $I_4$) may be called group signals. Background suppression (and signal accentuation) may be accomplished by using differential analog circuitry 212 to generate an in-phase differential current signal 214 ($I_{13}$)=$I_1$-$I_3$ and differential analog circuitry 216 to generate a quadrature differential current signal 218 ($I_{24}$)=$I_2$-$I_4$. These in-phase and quadrature signals may be called line signals. Comparing the phase of $I_{13}$ and $I_{24}$ permits detection of the direction of motion.

Referring to FIG. 2, the image captured on such a detector 202 may be magnified or de-magnified to achieve matching and so that the distribution of spatial frequencies in the image is roughly centered around the spatial frequencies of the detector. Through use of signal processing, it is possible to track the movement of this image as it moves back and forth across the detector 202 and from that tracking derive the motion of the surface 204 relative to the detector 202 along the long axis of the detector. Current processing techniques require that detector 202 outputs be weighted with coefficients derived from sine and cosine waves, combined together, and processed to produce two quasi-sinusoidal outputs representing separate in-phase and quadrature signals. These signals are then used to track motion.

Multi-Axis Array Detector for Motion Sensing

In accordance with an embodiment of the present invention it is desirable to have at least three 1-D detections to obtain both components of motion. This is particularly useful for speckle based sensors, since speckle is random, and any given eigenfunction could fade out, causing the loss of a signal. Note that no amount of filtering, e.g., Kalman filtering, can provide the correct motion if the user changes direction while the signal has faded. Thus, it is desirable to provide at least three signals to give some level of resistance to fading; more, of course, would be better, although the strategies for handling the extra information get a bit more complicated.

Strategies for Multi-Axis Arrays

There are a couple of different strategies or approaches that can be taken in placement of the arrays.

The present disclosure provides a means for embodying several dependent axes within a confined space. In accordance with an embodiment of the disclosed invention, photodiode elements arranged along three or more axes in a space-filling, close-packed array, are connected to each other in such a way that motion may be determined along each of the three or more axes by measuring differential photocurrents between diode array elements along each of the three or more axes.

Figure 3A:
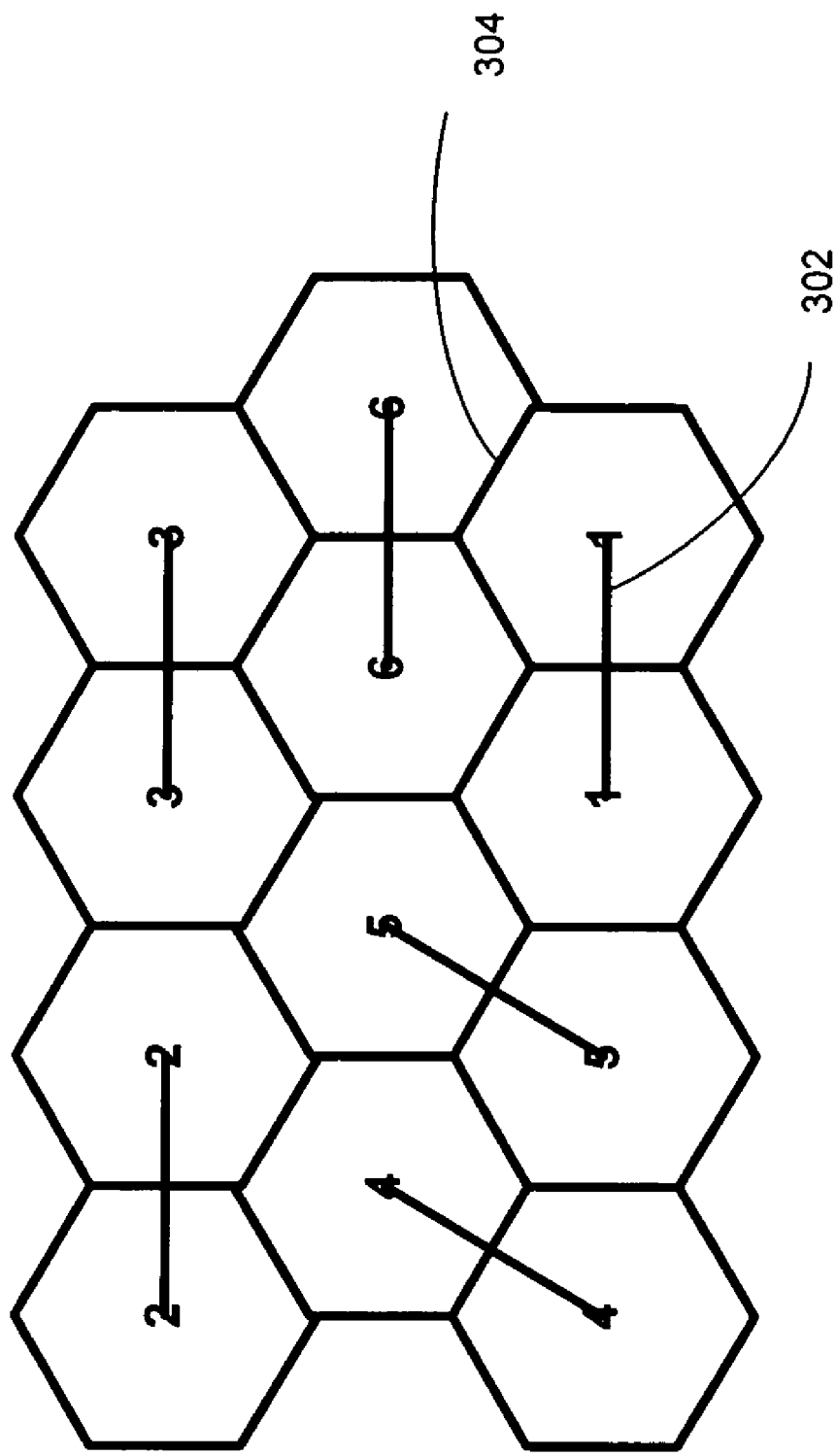
FIGS. 3A, 3B, and 3C are diagrams of a multi-axis array architecture according to an embodiment of the present invention showing a dense packed hexagonal lattice of photodiodes.

In one embodiment, the array consists of a hexagonal close-packed array that may provide the densest configuration of multiple dependent axes for motion detection. An example of a three-axis hexagonal array consisting of six types of photodiodes (two for each axis) is shown in FIG. 3A. FIG. 3A is a diagram of a test structure, showing a unit cell 300 of a dense packed hexagonal lattice. The unit cell 300 consists of twelve hexagonal photodiode cells of six different types. The photodiode types are labeled 1, 2, 3, 4, 5, and 6, and they are used to detect motion along three dependent axes. Photodiode cells of a same type are electrically coupled by conductive connections 302. Implementation of metal routing 304 along hexagonal pixel edges as shown in FIG. 3A. also provides light blocking between pixels to better delineate individual pixels and reduce cross-talk.

Figure 3B:
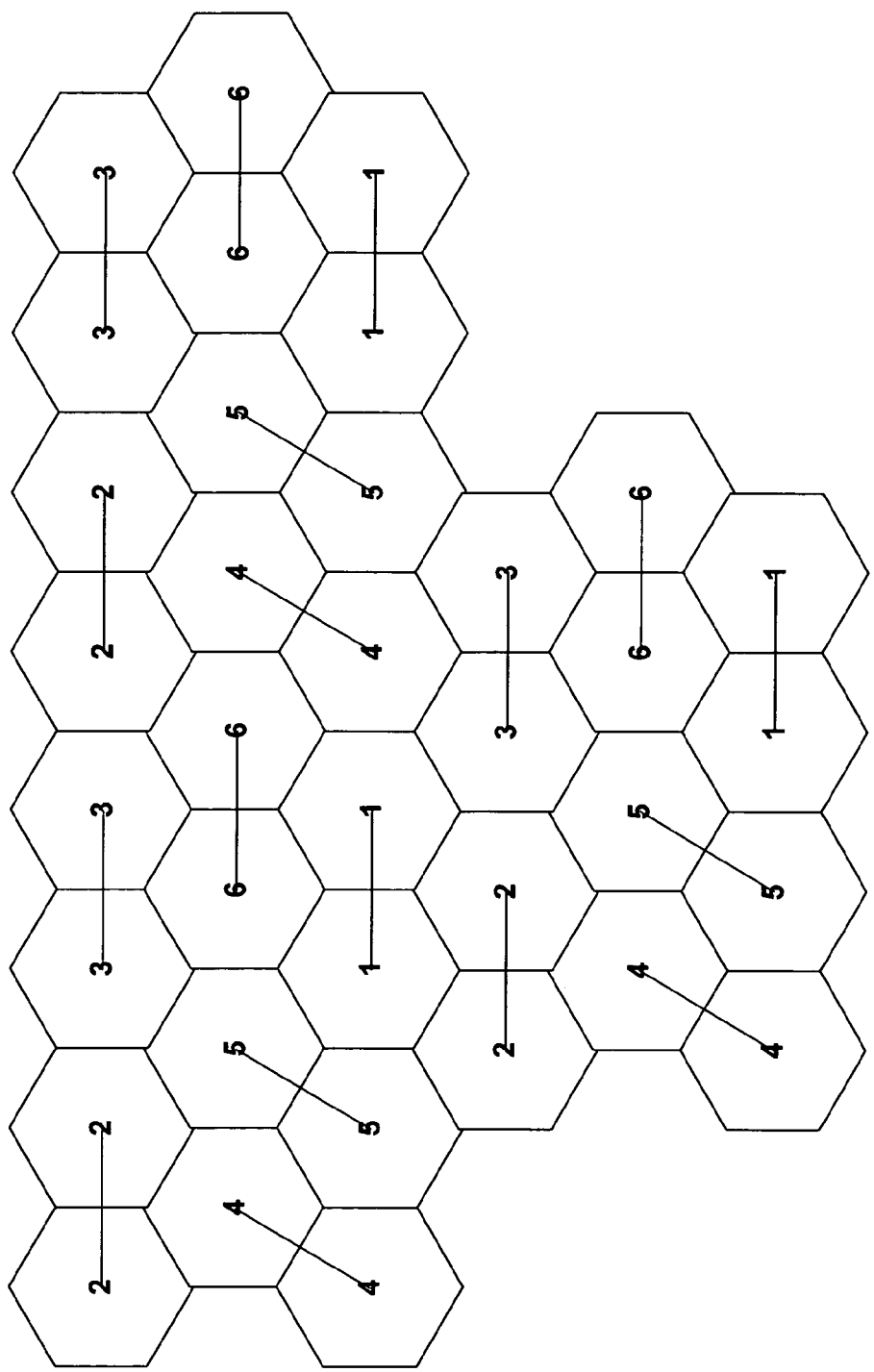
Figure 3C:
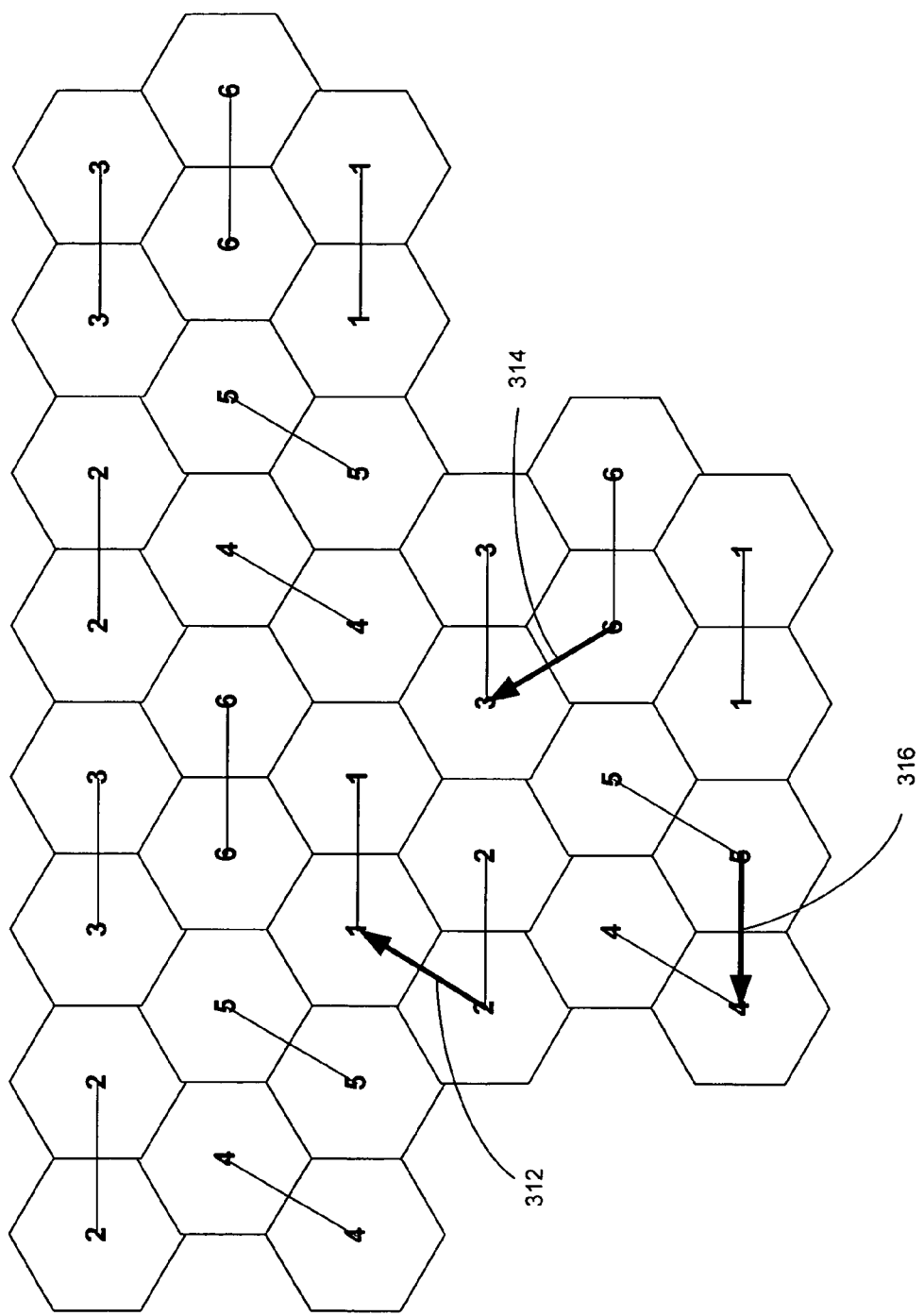

FIG. 3B illustrates three neighboring unit cells 300 of the array, and how they adjoin each other. Referring to FIG. 3C, motion along each axis is determined by the differential current between i) types 1 and 2 (60 degree axis 312), ii) types 3 and 6 (120 degree axis 314), and iii) types 4 and 5 (180 degree axis 316).

Figure 4A:
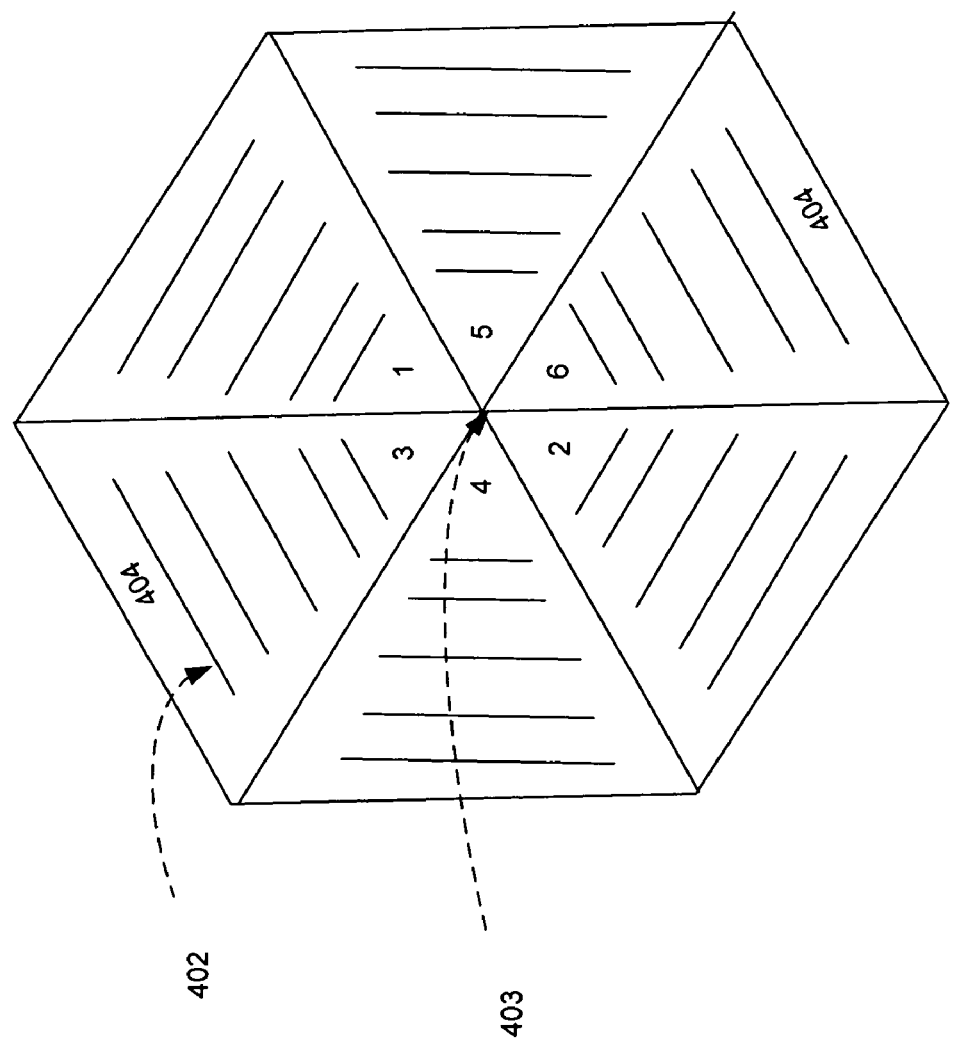
FIGS. 4A and 4B are layout diagrams of a three-axis photodiode array architecture having concentric, tapered linear arrays according to an embodiment of the present invention.
Figure 4B:
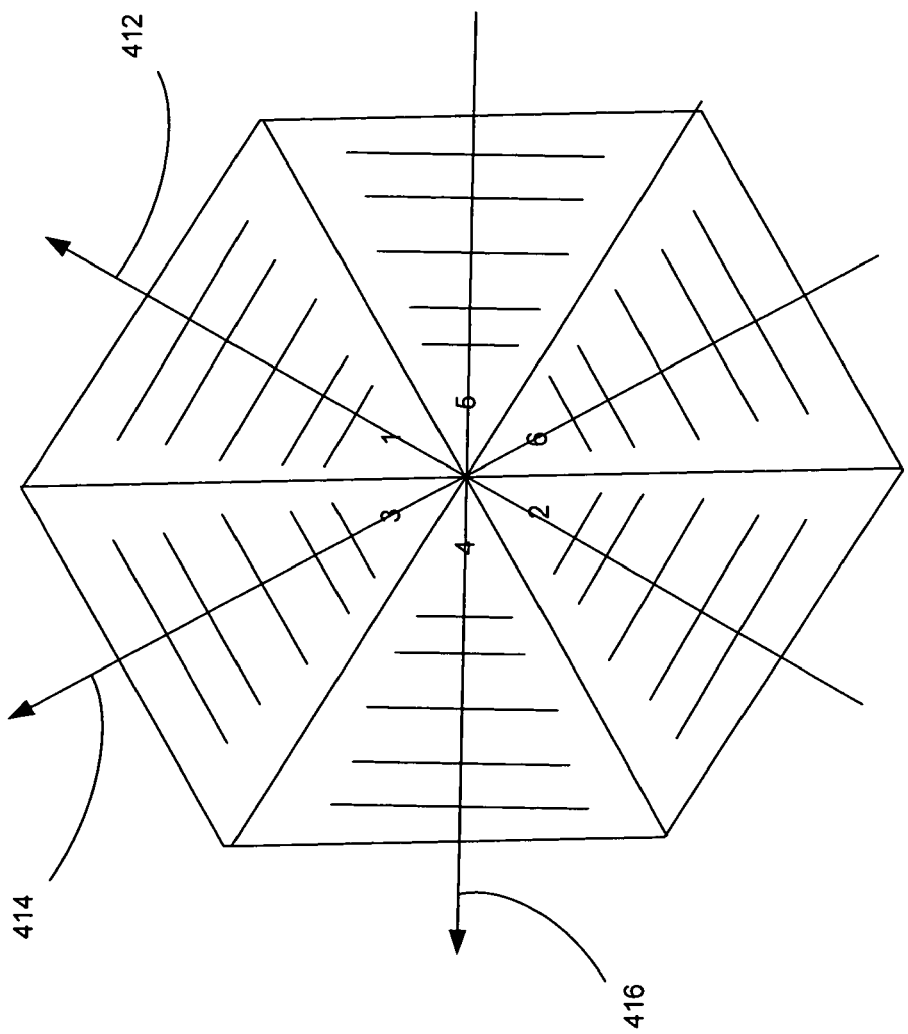

Another embodiment of a space-filling, multi-axis array is shown in FIG. 4A. FIG. 4A is a schematic diagram of a unit cell 400 of a compact, space-filling 3-axis axis photodiode array, consisting of three "concentric," tapered linear arrays. In this embodiment, the three concentric tapered linear arrays 402 are placed with coincident centers 403 and tapered toward the common center 403 in a 'pin-wheel' type configuration. Each concentric tapered linear array comprises two opposing triangular sections 404. As shown in FIG. 4A, the triangular sections in this example are labeled 1, 2, 3, 4, 5, and 6. The photodiode cells within each triangular section are electrically coupled by conductive connections. As illustrated in FIG. 4B, motion along each of three axes is determined by the differential current between i) sections 1 and 2 (60 degree axis 412), ii) sections 3 and 6 (120 degree axis 414), and iii) sections 4 and 5 (180 degree axis 416).

This configuration provides multiple dependent axes within a compact space.

Figure 5A:
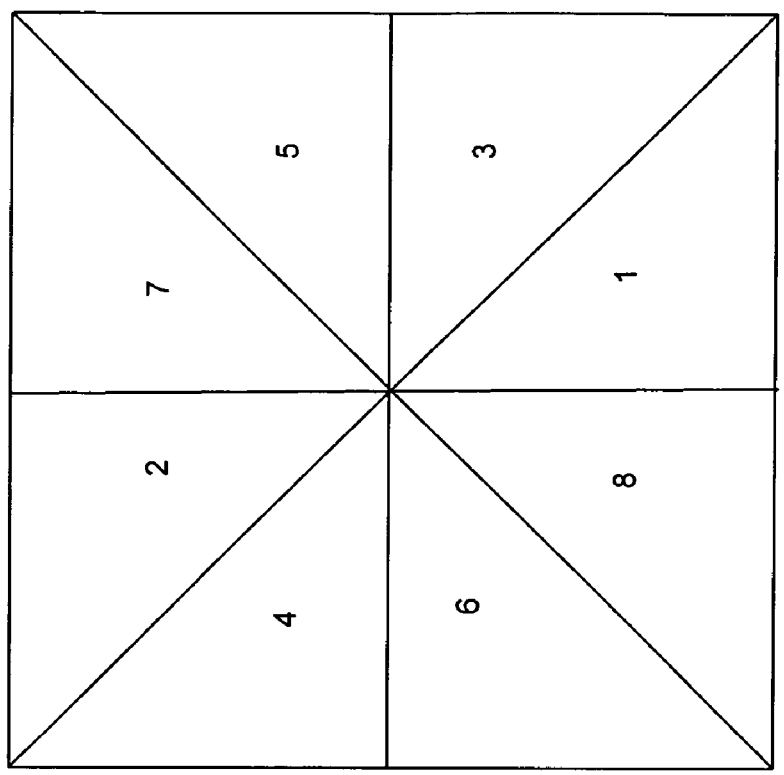
FIGS. 5A, 5B, and 5C are alternative layout diagrams of multi-axis array architectures according to embodiments of the present invention.
Figure 5B:
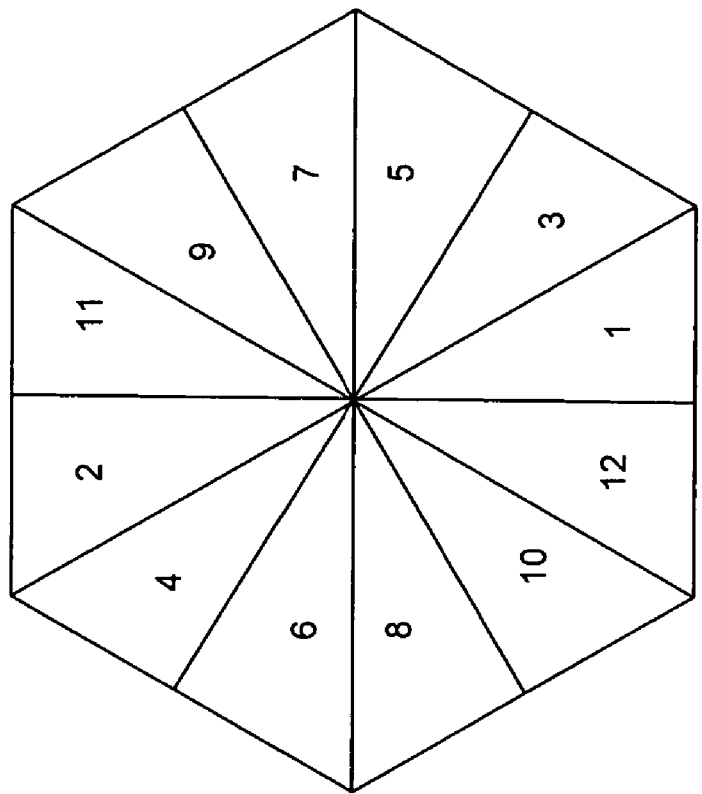

The 'pin-wheel' type configuration may be generalized to provide one or more additional axes as shown, for example, in FIGS. 5A and 5B. Within a single axis there can also be redundant channels to provide for dropouts or low signal level.

Figure 5C:
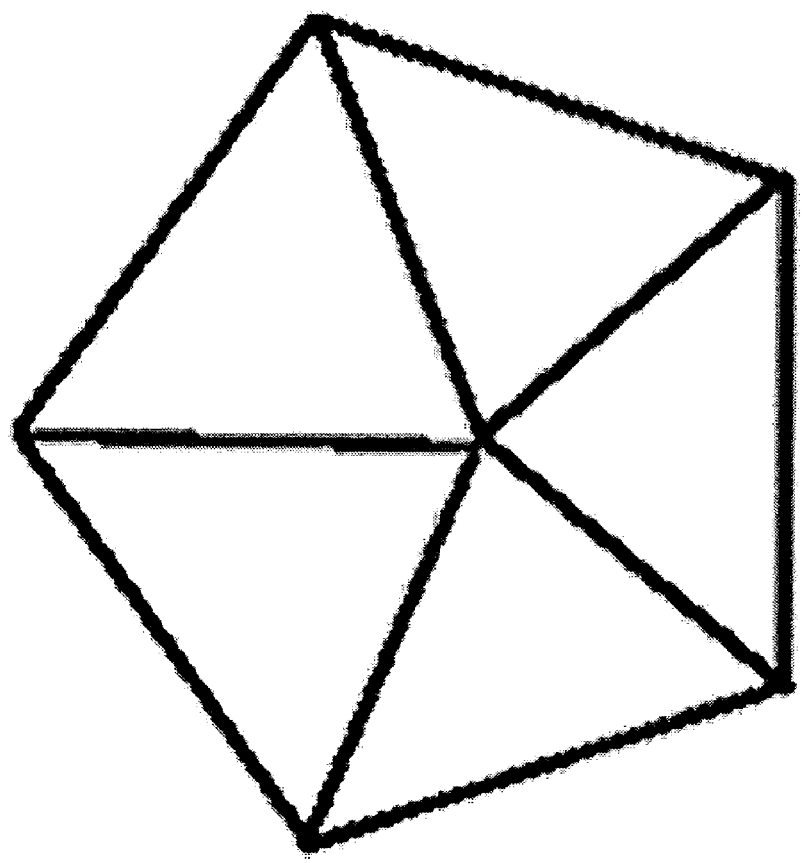

A generalization of 'pin-wheel' type configurations including additional numbers of axes is shown in FIGS. 5A to 5C.

FIG. 5A shows a configuration with four concentric tapered linear arrays, each such array comprising two opposing triangular sections. Since the unit cell is in the shape of a square, it may be used to form a close-packed array. As shown in FIG. 5A, the triangular sections in this example are labeled 1, 2, 3, 4, 5, 6, 7 and 8. The photodiode cells within each triangular section are electrically coupled by conductive connections. In this configuration, motion along each of four axes is determined by the differential current between i) sections 1 and 2, ii) sections 3 and 4, iii) sections 5 and 6, and iv) sections 7 and 8.

FIG. 5B shows a unit cell configuration with six concentric tapered linear arrays, each such array comprising two opposing triangular sections. Since the unit cell is in the shape of a hexagon, it may be used to form a close-packed array. As shown in FIG. 5B, the triangular sections in this example are labeled 1, 2, 3, 4, 5, 6, 7, 8, 9, 10, 11, and 12. The photodiode cells within each triangular section are electrically coupled by conductive connections. In this configuration, motion along each of six axes is determined by the differential current between i) sections 1 and 2, ii) sections 3 and 4, iii) sections 5 and 6, iv) sections 7 and 8, v) sections 9 and 10, vi) sections 11 and 12.

FIG. 5C shows a pin-wheel type configuration with five triangular sections. Since the unit cell is in the shape of a pentagon, it may not be used to form a close-packed array. As shown in FIG. 5B, the triangular sections in this example are labeled 1, 2, 3, 4, and 5. The photodiode cells within each triangular section are electrically coupled by conductive connections. In this configuration, motion along each of five axes may be determined by the appropriate linear combinations of the currents from the five sections.

An advantage of the apparatus and method of the present invention over previous or conventional approaches include: (i) fade resistant signal for off axis movement through the use of multiple dependent axes; (ii) reduced occurrence of dropouts or low signal level through use of redundant channels within a single axis; (iii) increased efficiency in the utilization of die space by enabling implementation of multiple dependent axes within a confined space; and (iv) metal routing between along pixel edges provides light blocking between pixels to better delineate individual pixels and reduce cross-talk.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical displacement sensor for sensing relative movement between the sensor and a surface by detecting changes in optical features of light reflected from the surface, the sensor comprising:

a two-dimensional array of photosensitive elements, the array including multiple groupings of photosensitive elements arranged along at least three (3) axes, so as to track motion along each of the at least three axes by measuring differential photocurrents between the groupings of photosensitive elements, whereby signal redundancy is achieved so as to reduce an effect of low signals from photosensitive elements along any particular one of the at least three axes, wherein each of the at least three axes form non-orthogonal angles to the remaining axes, wherein the array comprises six (6) groupings of photosensitive elements, two (2) for each axis, arranged at angles of 60, 120 and 180 degrees to a predetermined reference vector so as to form a three-axis hexagonal array, and wherein the photosensitive elements are further arranged to form a number of hexagonal pixels in the array, and wherein the array further comprises metal routing along each hexagonal pixel to provide light blocking between the pixels and reduce cross-talk between the pixels.

2. The optical displacement sensor according to claim 1, wherein each grouping is paired with another grouping, and each pair of groupings corresponds to an axis.

3. The optical displacement sensor according to claim 2, wherein the pairs of groupings are arranged with coincident centers, and wherein each grouping has a shape which is tapered toward the center to form a 'pin-wheel' type configuration.

4. The optical displacement sensor according to claim 3, wherein the 'pin-wheel' type configuration comprises a polygonal shape.

5. The optical displacement sensor according to claim 4, wherein the polygonal shape comprises a square.

6. The optical displacement sensor according to claim 4, wherein the polygonal shape comprises a hexagon.

7. The optical displacement sensor according to claim 4, wherein the polygonal shape comprises a pentagon.

8. The optical displacement sensor according to claim 1, wherein the photosensitive elements arranged along a single axis include photosensitive elements coupled to provide redundant channels so as to achieve further redundancy.

* * * * *